United States Patent [19]
Nishikubo et al.

[11] Patent Number: 6,117,944
[45] Date of Patent: Sep. 12, 2000

[54] CURABLE COMPOSITION

[75] Inventors: Tadatomi Nishikubo, Fujisawa; Atsushi Kameyama, Yokohama, both of Japan

[73] Assignee: Kanagawa University, Kanagawa, Japan

[21] Appl. No.: 09/220,222

[22] Filed: Dec. 23, 1998

[30] Foreign Application Priority Data

Sep. 1, 1998 [JP] Japan .................................. 10-263957

[51] Int. Cl.$^7$ .............................. C08F 8/00; C08L 63/10
[52] U.S. Cl. .......................... 525/109; 525/108; 525/132; 528/154; 528/104; 528/87; 528/425; 528/486; 528/487
[58] Field of Search ..................... 525/109, 108, 525/132; 528/154, 104, 87, 425, 486, 487

[56] References Cited

U.S. PATENT DOCUMENTS 4,104,433  8/1978  Kirk et al. ............................... 428/245
5,439,989  8/1995  Morton et al. ........................... 525/502

OTHER PUBLICATIONS

Chem Abstract. 63: 171446 "Active energy ray curable compositions for cured products with good adhesion to base materials" Yutaka et al.

Polymer Preprints, Japan vol. 46, No. 2, (1997) The Society of Polymer Science, Japan.

Reactive & Functional Polymers 37 (1998) Elsevier Science, B.V., T. Nishikubo et al., pp. 19–25.

*Primary Examiner*—Duc Truong
*Attorney, Agent, or Firm*—Baker & Daniels

[57] ABSTRACT

A curable composition comprising a polyfunctional oxetane compound and a polyphenol compound or phenol resin, where a quaternary onium salt or Crown ether compound is preferably further contained as a curing catalyst, provides a novel use for reactions of the oxetane compound as a 4-membered cyclic ether compound.

10 Claims, No Drawings

CURABLE COMPOSITION

BACKGROUND OF THE INVENTION

1. Field of the Invention

The present invention relates to a curable composition and more particularly to a curable composition comprising a bisphenol compound or phenol resin as a curable component.

2. Description of Related Art

It is known that cyclic ether compounds of 3-membered or 4-membered ring have an unbalanced electric charge distribution owing to ring distortion energy or strong electron attractiveness of endocyclic oxygen atom and thus show a high reactivity. Above all, epoxy compounds of three-membered ring ether structure easily react with various nucleophilic reagents or electrophilic reagents and thus are widely used in organic synthesis reactions. On the other hand, it is also known that oxetane compounds, i.e. cyclic ether compounds of 4-membered ring, can easily undergo ring-opening polymerization by Lewis acids, etc. as an initiator to give polyethers of high molecular weight, but addition reaction, etc. using oxetane compounds have not been reported so far.

SUMMARY OF THE INVENTION

An object of the present invention is to provide a novel use in reactions of an oxetane compound as a cyclic ether compound of 4-membered ring.

The object of the present invention can be attained by a curable composition which comprises a polyfunctional oxetane compound and a polyphenol compound or phenol resin, where a quaternary onium compound or Crown ether complex can be preferably further contained as a curing catalyst.

DETAILED DESCRIPTION OF THE INVENTION

Polyfunctional oxetane compounds for use in the present invention include oxetane compounds having bifunctional or higher functional groups, for example, a bisoxetane compound [I], represented by the following general formula:

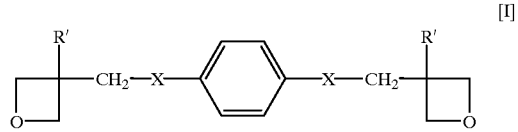

[I]

a calix[4]resorcinarene derivative [II] having 3-lower alkyl-3-oxetanyl-methoxy groups, represented by the following general formula:

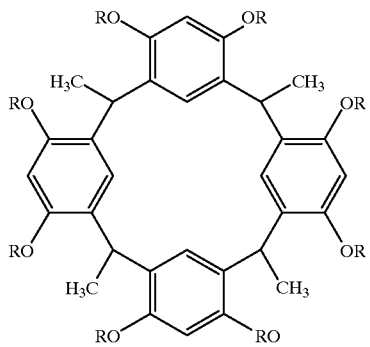

[II]

and a p-lower alkylcalixarene derivative [III] having lower alkyl-3-oxetanylmethoxy groups, represented by the following general formula:

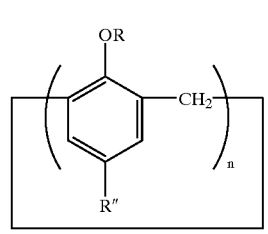

[III]

where R is a group represented by the following general formula:

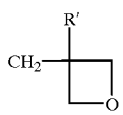

R' and R" are each a lower alkyl group; X is a $CH_2O$ group or a COO group; and n is an integer of 4 to 12, preferably 6 to 8 throughout all the formulae [I] to [III].

Bisoxetane compound [I] represented by the foregoing general formula can be prepared by reacting one part by mole of a 3-lower alkyl-3-methyloloxetane such as 3-methyl-3-methyloloxetane, 3-ethyl-3-methyloloxetane, etc. with two parts by mole of p-xylylene dihalide or terephthalic acid dihalide. The reaction can be carried out in the presence of a quaternary onium salt, a tertiary amine, or the like as a catalyst. In case of p-xylylene dihalide, NaOH, KOH or the like can be used together.

Calix[4]resorcinarene derivative [II] having oxetane rings or p-lower alkylcalixarene derivative [III] having oxetane rings, represented by the foregoing formulae can be prepared by reacting calix[4]resorcinarene or p-lower alkylcalixarene with 3-lower alkyl-3-methyloloxetane.

Curing reaction of these polyfunctional oxetane compounds can be carried out by a polyphenol compound or phenol resin.

Polyphenol for use in the present invention includes, for example, bisphenol compounds such as bisphenol A or its 3,3',5,5'-tetrachloro substituted compound, bisphenol F, bisphenol AF, bisphenol S or its 3,3',5,5'-tetrabromo substituted compound, hydrogenated bisphenol A, bisphenol, etc.; trisphenol compounds such as 4,4',4"-methylidenetrisphenol, 4,4',4"-ethylidenetrisphenol, etc.; and calix[4]

resorcinarene, p-methylcalix[6]arene, p-t-butylcalix[8] arene, poly(o-, m- or p-hydroxy-styrene), etc.

When calixarenes such as calix[4]resorcinarene, p-lower alkyl-calixarene, etc. among these polyphenol compounds are used as a crosslinking agent, cured products particularly having a higher crosslinking density and a higher glass transition point (Tg) can be obtained.

Phenol resin for use in the present invention includes, for example, novolak type phenol resin, represented by the following general formula:

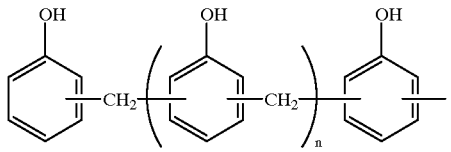

cresol type novolak resin, represented by the following general formula:

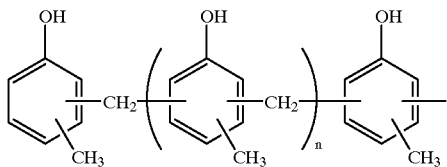

and resorcinol type phenol resin, represented by the following general formula:

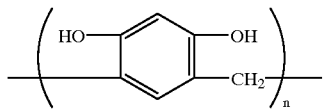

In these various phenol resins, at least one of o-, m- or p-cresol, 2,3-, 2,4-, 2,5-, 2,6-, 3,4- or 3,5-xylenol, p-tert.-butylphenol, p-phenylphenol, resorcinol, etc. can be also used for the phenol compounds beside the simple phenol.

Polyfunctional oxetane compound can be used in a equivalent ratio of about 0.5 to about 2.0, preferably about 0.8 to about 1.5, more preferably 1.0, in terms of the oxetanyl group to the hydroxyl groups of the polyphenol compound or phenol resin.

Curing reaction of a polyphenol compound or phenol resin by polyfunctional oxetane compound can be carried out at a temperature of about 90° to about 250° C., preferably about 150° to about 190° C. for about 30 minutes to about 8 hours, preferably about 30 minutes to about 6 hours in the absence of a curing catalyst, but preferably in the presence of a quaternary onium salt or Crown ether complex catalyst, where an increase in the degree of curing or shortening of curing time can be observed.

Quaternary onium salt as a catalyst can be represented by the following general formula, and quaternary phosphonium salts can be preferably used:

$(R_1R_2R_3R_4N)^+X^-$ or $(R_1R_2R_3R_4P)^+X^-$ where $R_1$ to $R_4$ are each an alkyl group having 1 to 25 carbon atoms, an alkoxy group, an aryl group, an alkylaryl group, an aralkyl group or a polyoxyalkylene group, or two or three of which may form a heterocyclic structure together with N or P; and $X^-$ is an anion such as $Cl^-$, $Br^-$, $I^-$, $HSO_4^-$, $H_2PO_4^-$, $RCOO^-$, $ROSO_2^-$, $RSO^-$, $ROPO_2H^-$, $CO_3^{--}$, etc.

Specifically, it includes quaternary ammonium salts such as tetra-butylammonium bromide, tetrabutylammonium chloride, tetrabutyl-ammonium iodide, tetraethylammonium bromide, tetraethylammonium chloride, tetraethylammonium iodide, n-dodecyltrimethylammonium bromide, octadecyltrimethylammonium bromide, trimethylbenzylammonium bromide, cetyldimethylbenzylammonium chloride, cetyl-pyridinium bromide, cetyl-pyridinium sulfate, tetraethylammonium acetate, trimethylbenzylammonium benzoate, trimethylbenzylammonium borate, 5-benzyl-1,5-diaza-bicyclo[4,3,0]-5-nonenium chloride, 5-benzyl- 1,5-diazabicyclo[4,3,0]-5-nonenium tetrafluoroborate, etc.; quaternary phosphonium salts such as tetraphenylphosphonium chloride, benzyltriphenylphosphonium bromide, benzyltriphenylphosphonium chloride, triphenylmethoxymethylphosphonium chloride, triphenylmethylcarbonyl-methylphosphonium chloride, triphenylethoxycarbonylmethylphosphonium chloride, trioctylbenzylphosphonium chloride, trioctylmethylphosphonium chloride, trioctylethylphosphonium acetate, tetraoctylphosphonium chloride, trioctylethylphosphonium dimethylphosphate, etc.

Curing reaction of polyfunctional oxetane compound by polyphenol compound or phenol resin can be also carried out in the presence of Crown ether complex as a catalyst. Crown ether for this purpose includes, for example, 12-Crown-4, 15-Crown-5, 18-Crown-6, dibenzo-18-Crown-6, 21-Crown-7, 24-Crown-8, etc., which are used as complexes with in organic or organic salts such as KF, KCl, KBr, CsF, CsCl, CsBr, potassium thiocyanate, sodium phenoxide, potassium phenoxide, sodium benzoate, potassium benzoate, sodium acetate, potassium acetate, etc.

The quaternary onium salt or Crown ether complex catalyst can be used in a proportion of about 1 to about 20% by mole, preferably about 2 to about 10% by mole on the basis of polyfunctional oxetane compound. Even above about 20% by mole, no more remarkable effect can be obtained.

Curing reaction in the presence or absence of such a catalyst is carried out by dissolving the polyfunctional oxetane compound, the polyphenol compound or phenol resin (and the curing catalyst) into a soluble solvent such as tetrahydrofuran, dimethylformamide, dimethylacetamide, N-methyl-2-pyrrolidone, etc., and applying the solution to an appropriate substrate, followed by drying at room temperature to about 110° C. and heating under the above-mentioned curing reaction conditions, or can be also carried out by mixing through rolls such as a three-roll mixer, etc., where a solvent is not always required.

The present curable composition is distinguished not only in the dimensional stability owing to less volume shrinkage during the curing, but also in the heat resistance. As given in Examples 10 and 11, which follows, this seems to be due to the fact that while the addition reaction of oxetane ring with phenol group was in progress interesterification took place between the resulting alcoholic hydroxyl groups and intramolecular ester groups at the last stage of the addition reaction, resulting in effective occurrence of crosslinking reaction.

PREFERRED EMBODIMENTS OF THE INVENTION

The present invention will be described in detail below, referring to Reference Examples and Examples.

REFERENCE EXAMPLE 1

14.17 g(0.053 moles) of p-xylylene dibromide as dissolved in 320 ml of toluene, 10.96 g(0.107 moles) of 3-methyl-3-methyloloxetane, 4.99 g(0.015 moles) of tetrabutylammonium bromide and an aqueous 50 wt. % sodium hydroxide solution (NaOH 85 g/H₂O 85 ml) were charged into a three-necked flask having a capacity of 1 L and the mixture was vigorously stirred at 50° C. for 2 hours by a three-one motor.

After the reaction, the reaction mixture was separated into a toluene phase and an aqueous phase, and the toluene phase was washed with distilled water and dried over anhydrous magnesium sulfate overnight. After distilling off toluene, the residue was subjected to preparative chromatography, whereby 3.56 g of 1,4-bis[3-(3-methyloxetanyl)methoxymethyl]benzene [BMOB] having the following formula was obtained as a colorless transparent liquid [yield: 22%]:

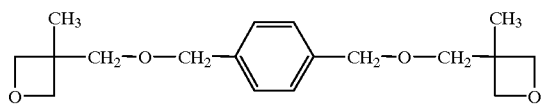

Infrared absorption spectrum: 1253 cm$^{-1}$(C—O—C ether) 985 cm$^{-1}$(C—O—C cyclic ether)

$^1$H-NMR(200 MHz, TMS, CDCl₃) δ(ppm):
1.34(s, 6.0 H, —C$\underline{H}_3$), 3.53(s, 4.0 H, C—C$\underline{H}_2$—OCO), 4.45(d, 2.1 H, J=5.9 Hz, —C$\underline{H}_2$—O—, oxetane), 4.65 (d, 2.0 H, J=5.9 Hz, —C$\underline{H}_2$—O—, oxetane), 8.14 (s, 4.0 H, aromatic H)

REFERENCE EXAMPLE 2

31.95 g(0.350 mole) of 3-ethyl-3-methyloloxetane was charged into a three-necked separable flask having a capacity of 500 ml and then 100 ml of tetrahydrofuran was added thereto to dissolve 3-ethyl-3-methyloloxetane. Then, 35.57 g (0.175 moles) of terephthalic acid dichloride diluted with 100 ml of tetrahydrofuran was dropwise added to the solution under ice cooling over about 20 minutes. Furthermore, 53.13 g (0.525 moles) of triethylamine diluted with 100 ml of tetrahydrofuran was dropwise added thereto under ice cooling over about 20 minutes, and then the mixture was stirred under ice cooling for about 3 hours.

After the reaction, the reaction mixture was poured into 500 ml of distilled water to precipitate the product, followed by filtration, recrystallization from a solvent mixture of n-hexane-methyl ethyl ketone (ratio by volume=1:1) and drying at 60° C. under reduced pressure for 10 hours, whereby 23.41 g of bis[3-(3-ethyloxetanyl)methyl] terephthalate [BEOT] having the following formula was obtained as white crystals having a melting point of 126.0° to 127.0° C. (yield: 40%).

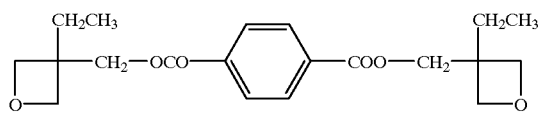

Infrared absorption spectrum: 1711 cm$^{-1}$(C=O) 1509 cm$^{-1}$(C=C aromatic) 1253 cm$^{-1}$(C—O—C ether) 985 cm$^{-1}$(C—O—C cyclic ether)

$^1$H-NMR(200 MHz, TMS, CDCl₃) δ(ppm):
1.44(s, 6.0 H, —C$\underline{H}_3$), 4.43(s, 4.0 H, C—C$\underline{H}_2$—O), 4.49~4.65(m, 12.2 H, —CH₂—O—, oxetane, —C$\underline{H}_2$—aromatic), 8.14(s, 4.0 H, aromatic H)

EXAMPLE 1

0.05 g of calix[4]resorcinarene derivative having 3-ethyl-3-oxetanylmethoxy groups (0.167 m moles in terms of oxetanyl group), 0.04 g of bisphenol A (0.167 m moles in terms of phenol group) and tetraphenylphosphonium bromide (0.01 m mole) were weighed out into a sample bottle and dissolved into 0.3 ml of tetrahydrofuran.

The tetrahydrofuran solution was applied to KBr plates and dried at room temperature, and then heated at 150° C., 170° C. or 190° C. each for 5 hours. At the same time, absorption attributable to the ether bond of oxetane at 970 cm$^{-1}$ by infrared absorption spectrum was measured from time to time to determine the reactivity.

The reactivity was increased with increasing reaction time and reaction temperature, and the reactivity after 5 hours' reaction reached about 45% at 150° C., about 50% at 170° C. and about 65% at 190° C. Each of the polymer films after the 5 hours' reaction was found insoluble in the 4 kinds of solvents, i.e. tetrahydrofuran, dimethylformamide, dimethyl-acetamide and N-methyl-2-pyrrolidone, showing that crosslinking reaction occurred.

EXAMPLE 2

In Example 1, 0.033 g of novolak type phenol resin (0.3 m moles in terms of phenol resin) was used in place of bisphenol A. Reactivity after 5 hours' reaction reached about 30% at 150° C., about 55% at 170° C. and about 60% at 190° C. Each of the polymer films after the 5 hours' reaction was found insoluble in the solvents as in Example 1, showing that crosslinking reaction occurred.

EXAMPLE 3

0.022 g of novolak type phenol resin pulverized in a mortar (0.22 m moles in terms of phenol group), 0.068 g of BMOB prepared in Reference Example 1 (0.22 moles in terms of oxetanyl group) and 0.003 g (0.01 m mole) of triphenylphosphonium bromide were weighed out into a sample bottle and dissolved into 0.3 ml of tetrahydrofuran.

The tetrahydrofuran solution was used in the same manner as in Example 1 and heated for predetermined periods of time. Reactivity was somewhat just below about 70% after 8 hours' reaction at 150° C., about 80 to about 85% after 2–3 hours' reaction at 170° C. and somewhat just below 90% after one hour reaction at 190° C. Each of polymer films after heating for the predetermined periods of time was found insoluble in the solvents as in Example 1, showing that crosslinking reaction occurred.

EXAMPLE 4

0.088 g of p-methylcalix[6]arene having 3-ethyl-3-oxetanylmethoxy groups (0.4 m moles in terms of oxetanyl group), 0.072 g of 3,3', 5,5'-tetrachlorobisphenol A (0.2 m moles in terms of phenol group) and 0.008 g (0.02 m moles) of tetraphenylphosphonium chloride were weighed out into a sample bottle, and dissolved into 1 ml of dimethylformamide.

The dimethylformamide solution was used in the same manner as in Example 1 and heated at 170° C. for 5 hours. Reactivity as determined was somewhat just below about 60%. The resulting polymer film was found insoluble in tetrahydrofuran, dimethylformamide and N-methyl-2-pyrrolidone, showing that crosslinking reaction occurred.

EXAMPLE 5

0.104 g of p-tert.-butylcalix[8]arene having 3-methyl-3-oxetanyl-methoxy group (0.4 m mole in terms of oxetanyl group), 0.072 g of 3,3', 5,5'-tetrachlorobisphenol A (0.2 m mole in terms of phenol group) and 0.008 g (0.02 m moles)

of tetraphenylphosphonium chloride were weighed out into a sample bottle and dissolved into 5 ml of dimethylacetamide.

The dimethylacetamide solution was used in the same manner as in Example 1 and heated at 180° C. for 5 hours. Reactivity as determined was about 55%. The resulting polymer film was found insoluble in tetrahydrofuran, dimethylformamide and dimethylacetamide, showing that crosslinking reaction occurred.

EXAMPLE 6

In Example 5, 0.048 g of novolak type phenol resin (0.4 m moles in terms of phenol group) was used in place of 3,3', 5,5'-tetrachloro-bisphenol A. With heating at 190° C. for 5 hours, the reactivity reached about 45%. The resulting polymer film was found likewise insoluble in the three kinds of the solvents, showing that crosslinking reaction occurred.

EXAMPLE 7

0.068 g of commercially available 1,4-bis[(3-ethyl-3-oxetanyl)methoxy-methyl]benzene [BEOB] (0.22 m moles in terms of oxetanyl group), 0.048 g of cresol type novolak resin (0.44 m moles in terms of phenol group) and 0.005 g (0.011 m mole) of tetraphenylphosphonium bromide were weighed out into a sample bottle and dissolved into 0.2 ml of N-methyl-2-pyrrolidone.

The N-methyl-2-pyrrolidone solution was used in the same manner as in Example 1 and heated at 180° C. for 3 hours. Reactivity as determined was somewhat just above about 50%. The resulting polymer film was a tough curing product and was found insoluble in tetrahydrofuran, dimethylformamide and dimethylacetamide, showing that crosslinking reaction occurred.

EXAMPLE 8

In Example 7, 0.03 g of calix[4]resorcinarene (0.22 m moles in terms of phenol group) was used in place of cresol type novolak resin. The reactivity was somewhat just above about 45%. The resulting polymer film was found likewise insoluble in the three kinds of solvents, showing that crosslinking reaction occurred.

EXAMPLE 9

In Example 8, 0.005 g (0.011 m mole) of 18-Crown-6/KBr was used as a catalyst in place of tetraphenylphosphonium bromide. The reactivity was about 30%. The resulting polymer film was found likewise insoluble in the three kinds of solvents, showing that crosslinking reaction occurred.

EXAMPLE 10

0.080 g of BEOT prepared in Reference Example 2 (0.22 m moles in terms of oxetanyl group), 0.081 g of 3,3', 5,5'-tetrachlorobisphenol A (0.22 m moles in terms of phenol group) and 0.005 g (0.011 m mole) of tetraphenylphosphonium bromide were weighed out into a sample bottle and dissolved into 0.2 ml of N-methyl-2-pyrrolidone.

The N-methyl-2-pyrrolidone solution was used in the same manner as in Example 1. With heating at 180° C. for one hour, the reactivity as determined was somewhat just below about 50%. The resulting polymer film was a tough curing product and was found insoluble in tetrahydrofuran, dimethylformamide and dimethylacetamide, showing that crosslinking reaction occurred.

EXAMPLE 11

0.080 g of BEOT prepared in Reference Example 2 (0.22 m moles in terms of oxetanyl group), 0.048 g of cresol type novolak resin (0.44 m moles in terms of phenol group) and 0.005 g (0.011 m mole) of tetraphenyl-phosphonium bromide were weighed out into a sample bottle and dissolved into 0.2 ml of N-methyl-2-pyrrolidone.

The N-methyl-2-pyrrolidone solution was used in the same manner as in Example 1. With heating at 180° C. for one hour, the reactivity as determined was somewhat just below about 40%. The resulting polymer film was a tough curing product and was found insoluble in tetrahydrofuran, dimethylformamide and dimethylacetamide, showing that crosslinking reaction occurred.

What is claimed is:

1. A curable composition, which comprises a polyfunctional oxetane compound and a polyphenol compound or phenol resin.

2. A curable composition according to claim 1, wherein the polyfunctional oxetane compound is a bisoxetane compound represented by the following general formula [I]:

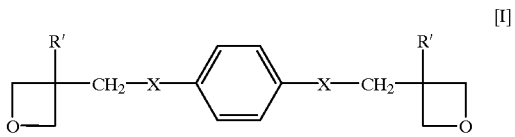

where R' is a lower alkyl group and X is a $CH_2O$ group or a $COO$ group.

3. A curable composition according to claim 1, wherein the polyfunctional oxetane compound is a calix[4] resorcinarene derivative having 3-lower alkyl-3-oxetanylmethoxy groups, represented by the following general formula [II]:

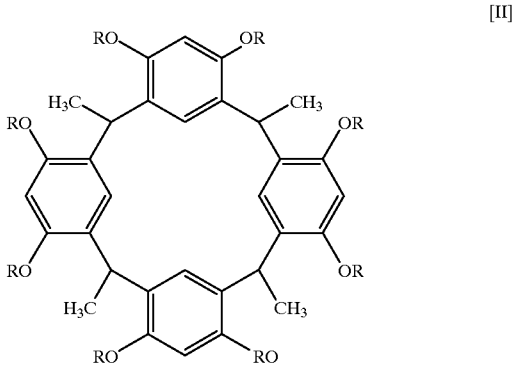

where R is a group represented by the following general formula:

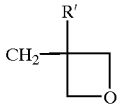

R' is a lower alkyl group.

4. A curable composition according to claim 1, wherein the polyfunctional oxetane compound is a p-lower alkyl-calixarene derivative having 3-lower alkyl-3-oxetanylmethoxy groups represented by the following general formula [III]:

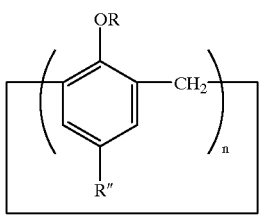

where R is a group represented by the following general formula:

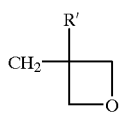

R' and R" are each a lower alkyl group and n is an integer of 4 to 12.

5. A curable composition according to claim 1, wherein the polyphenol compound is a bisphenol compound, a trisphenol compound, calixarenes or poly(hydroxystyrene).

6. A curable composition according to claim 1, wherein the phenol resin is novolak type, cresol type or resorcinol type phenol resin.

7. A curable composition according to claim 1, wherein the polyfunctional oxetane compound is used in a equivalent ratio of 0.5 to 2.0 in terms of oxetanyl group to the hydroxyl group of the polyphenol compound or the phenol resin.

8. A curable composition according to claim 1, wherein a quaternary onium salt or Crown ether complex is further contained as a curing catalyst.

9. A curable composition according to claim 8, wherein the quaternary onium salt is a quaternary ammonium salt or a quaternary phosphonium salt.

10. A curable composition according to claim 8, wherein the quaternary onium salt or the Crown ether complex in used in a proportion of 1 to 20% by mole to the polyfunctional oxetane compound.

* * * * *